F. L. STONE.
MOTOR CONTROLLER.
APPLICATION FILED DEC. 30, 1911.

1,064,025.

Patented June 10, 1913.
3 SHEETS—SHEET 1.

Witnesses:
Marcus L. Byng.
J. Ellis Eben

Inventor:
Fred L. Stone,
by [signature]
His Attorney.

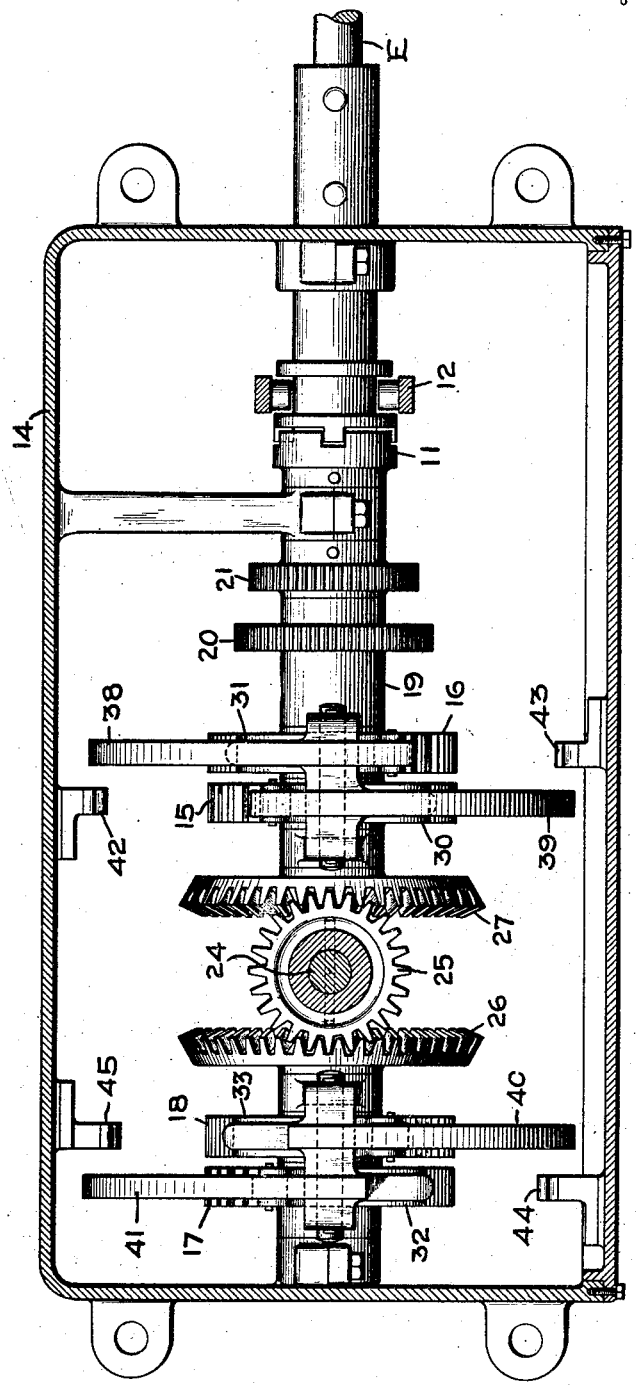

F. L. STONE.
MOTOR CONTROLLER.
APPLICATION FILED DEC. 30, 1911.

1,064,025.

Patented June 10, 1913.

3 SHEETS—SHEET 3.

Witnesses:

Inventor:
Fred L. Stone,
by His Attorney.

UNITED STATES PATENT OFFICE.

FRED L. STONE, OF SCHENECTADY, NEW YORK, ASSIGNOR TO GENERAL ELECTRIC COMPANY, A CORPORATION OF NEW YORK.

MOTOR-CONTROLLER.

1,064,02  Specification of Letters Patent.  Patented June 10, 1913.

Application filed December 30, 1911. Serial No. 668,660.

*To all whom it may concern:*

Be it known that I, FRED L. STONE, a subject of the King of Great Britain, residing at Schenectady, county of Schenectady, State of New York, have invented certain new and useful Improvements in Motor-Controllers, of which the following is a specification.

This invention relates to the control of electric motors and has for its object the provision of means whereby an electric motor may be started, stopped and generally controlled in a reliable and efficient manner.

My invention relates more specifically to the control of electric motors in such a way as to prevent too rapid acceleration or retardation, or both.

In the case of the ordinary resistance control by means of the controller, my invention has for its object to prevent the resistance from being varied too rapidly.

In certain types of control, as for instance in what is known as the Ward Leonard system, serious overloads may result from the too rapid variation of the controller resistance. One of the objects of my invention, therefore, is to prevent the operator from moving the controller beyond a certain predetermined speed.

In carrying out my invention I provide means whereby after the motor has once been started by the movement of the controller handle, further movement of the controller handle is limited by the rate of rotation of the motor. In the case of a hand operated controller the operator can start the motor and after it is started he can only move the controller as fast as the rotation of the motor will permit. Likewise in retarding the speed of the motor the movement of the controller is limited by the motor itself.

Other objects and purposes of my invention will appear in the course of the following specification in which I have shown my invention embodied in concrete form for purposes of illustration.

Figure 1:
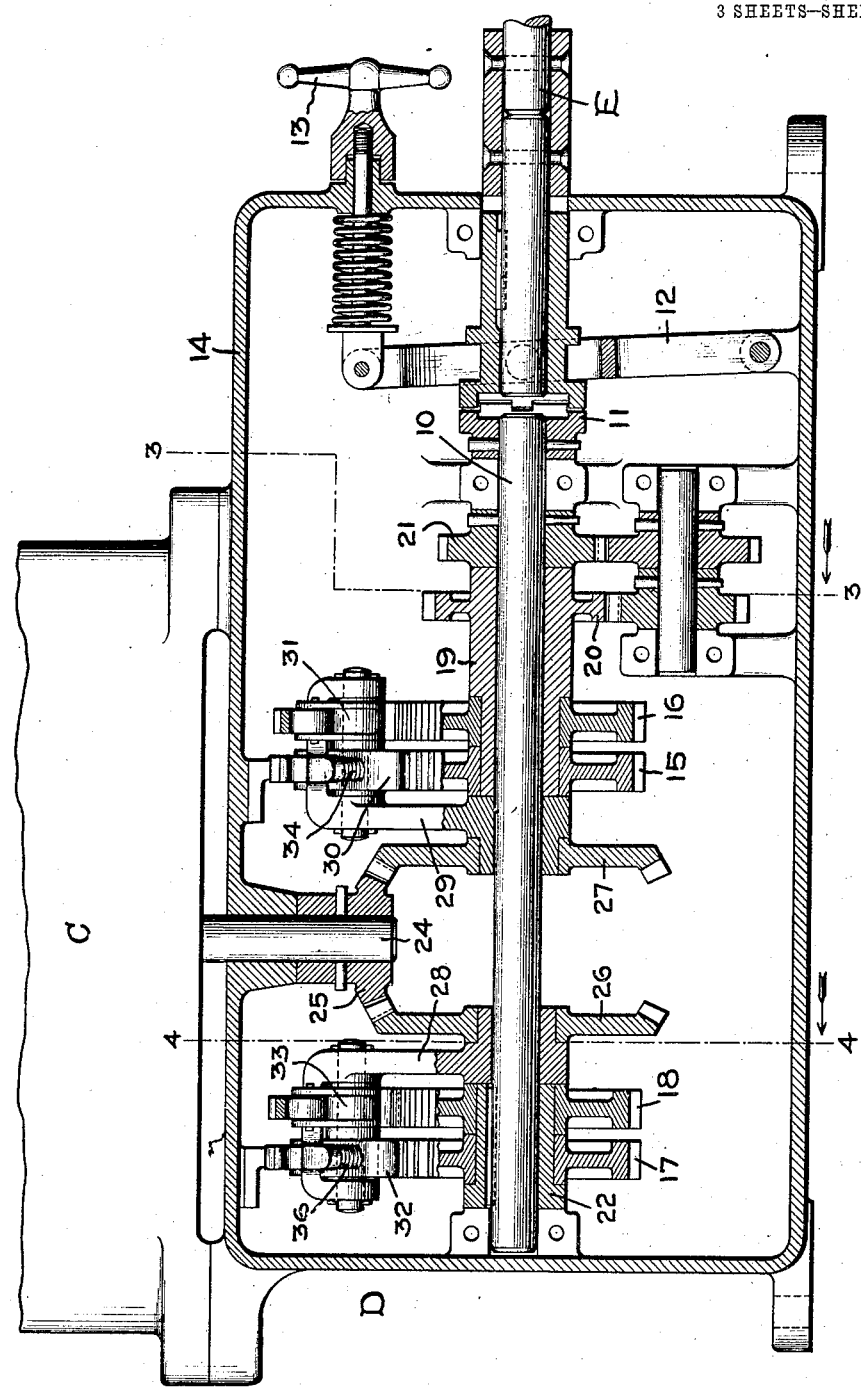
Figure 4:
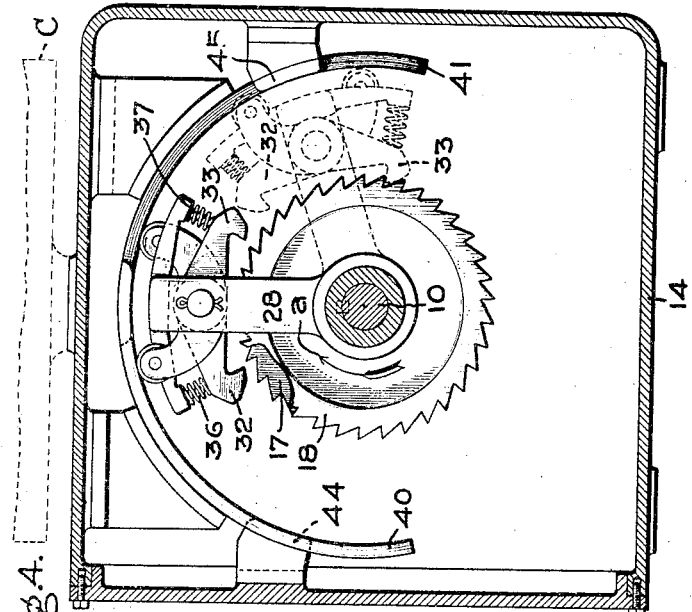
Figure 3:
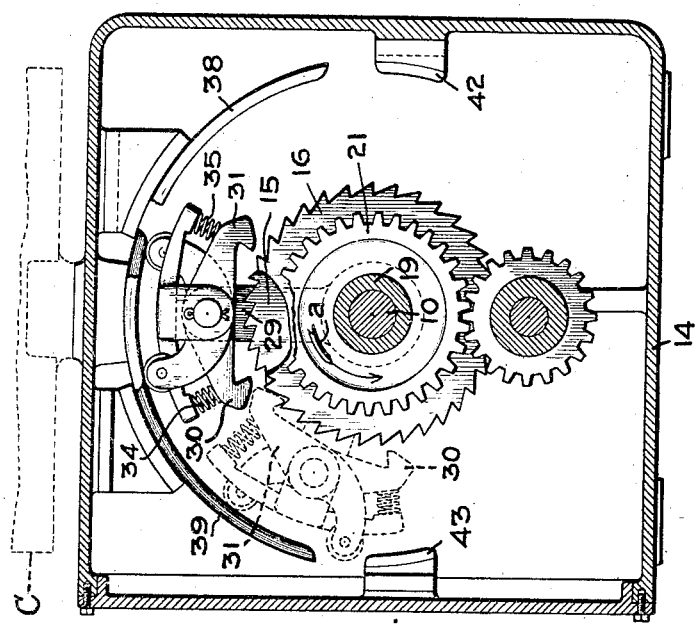
Figure 5:
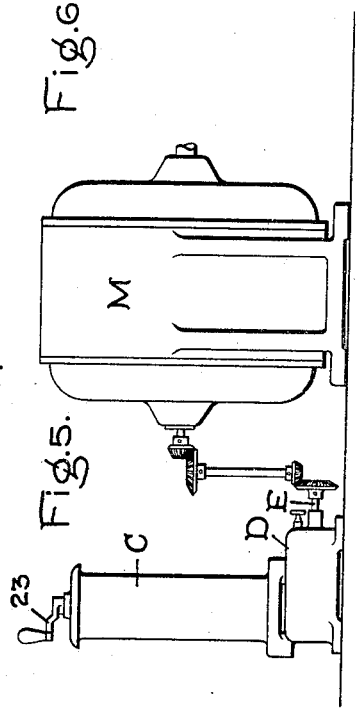

In the accompanying drawing illustrating my invention, Figure 1 is a sectional view of the retarding mechanism of my controller; Fig. 2 is an outside view of the same at right angles to that shown in Fig. 1; Fig. 3 is a section on the line 3—3 of Fig. 1; Fig. 4 is a section on the line 4—4 of Fig. 1; Fig. 5 shows the controller geared to the motor; and Fig. 6 is a diagram of the circuit connections.

Figure 6:
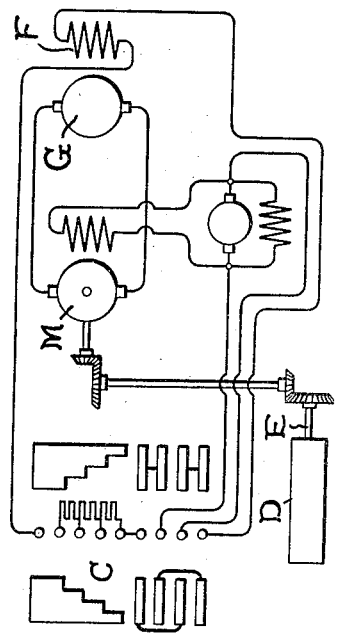

Referring first to Fig. 6, this figure shows diagrammatically a system in which my improved controller is particularly serviceable. In this system of control, which is known as the "Ward Leonard system", the speed of the motor M is varied by varying the field F of the generator G. This field is varied by means of the reversing controller C which so far as the arrangement of the control mechanism itself is concerned may be of any well-known type and requires no further description. It is well known that in operating a system of this character great care must be taken to prevent overloads due to too rapid acceleration or retardation or too rapid increase or reduction of generator voltage. In order to overcome the possibility of these troubles and make the control "fool proof" I have provided a controller in which the operator cannot move the controller any faster than it should be moved with safety. The movement of the controller is limited by the movement of the motor itself so as to allow the motor time to reach such a speed that its counter electromotive force will prevent an excessive flow of current.

In Fig. 5 I have shown the general arrangement of the motor and the controller. It will be seen that the controller C has additional mechanism D at its base which is provided with a shaft E driven from the motor shaft through bevel gearing as shown.

Referring now to Fig. 1 it will be seen that the shaft E is clutched to the shaft 10 by a jaw clutch 11. The clutch is operated by a pivoted lever 12 actuated by means of the handle 13 which may throw the clutch in or out as desired. This clutch makes it possible to operate the controller independently of the motor and also provides means for bringing the controller back to the starting position in case of failure of voltage. The shafts E and 10 have bearings in the cast iron casing 14 upon which the main controller C is mounted. The shaft 10 drives two sets of ratchet wheels 15 and 16 constituting one pair and 17 and 18 constituting the other pair. The two wheels 15 and 16 are oppositely disposed with reference to each other, that is, the teeth are set in opposite directions, the same being true of the wheels 17 and 18. These ratchet wheels are all driven in the same direction by the shaft 10. The two wheels 15 and 16, however, are driven slower than the wheels 17 and 18 for reasons hereinafter specified. This slower movement of the wheels 15 and 16 is accomplished by securing these wheels to a sleeve 19 which is driven from the main shaft through speed reducing gears 20 and
21. The wheels 17 and 18 are driven directly from the shaft by being secured to a bushing 22 which is keyed to the shaft. The controller handle 23 (Fig. 5) is mounted on the shaft 24 so that when the shaft 24 is rotated the resistance R will be varied in a well-known manner. Secured to the bottom of the shaft 24 is a bevel pinion 25 meshing with two beveled gears 26 and 27 respectively. These beveled gears are rigidly mounted on the hubs of arms 28 and 29 respectively which are loosely mounted on the shaft 10. These arms 28 and 29 each carry two pawls 30, 31, and 32, 33 respectively, the pawls 30 and 31 on the arm 29 coöperating with the ratchet wheels 15 and 16 while the pawls 32 and 33 on the arm 28 coöperate with the ratchet wheels 17 and 18. By referring to Figs. 3 and 4 it will be seen that these pawls which are pivoted intermediate their ends upon the arms are each provided on the opposite side of the pivot from the pawl hook with a roller which in certain positions of the controller engages with a segmental track which holds the pawl out of engagement with its ratchet wheel. When the roller runs off the track, the pawl upon which the roller is mounted is spring pressed toward the ratchet wheel by means of a spring. Four springs, 34, 35, 36 and 37, are therefore provided for the four pawls. The arrangement is such that when the controller handle is in the off position the parts will be as shown in full lines on Figs. 3 and 4 in which all of the pawls are held out of engagement with the ratchet wheels, thereby permitting an initial movement of the controller in either direction. This results from the fact that the two tracks 38 and 39 coöperating with the rollers on the pawls 31 and 30 overlap in the off position. Similarly the two tracks 40 and 41, coöperating with the rollers on pawls 33 and 32, overlap as shown in Fig. 4. In line with each of the tracks and near the position which the pawl mechanism reaches in the running position of the controller are short sections of track 42, 43, 44 and 45 for again engaging the rollers of the pawls to bring the pawls out of engagement with the ratchet wheels. This is for the purpose of having the controller handle free in the running position and avoiding wear of the pawl and ratchet mechanism.

The operation of my device is as follows: When the controller is in the off or starting position the parts will be in the position shown in full lines in Figs. 3 and 4, all of the pawls being held away from their coöperating ratchet wheels. If now it is desired to start the motor the controller handle 23 will be turned in the usual way to close the circuit through the resistance. Assuming that the controller and therefore the motor is turned in a direction so as to rotate the shaft 10 and parts connected therewith in the direction of the arrow a, Figs. 3 and 4, this movement of the controller handle turns the arm 29 in a counterclockwise direction, as shown in Fig. 3 and turns the arm 28 in a clockwise direction, as shown in Fig. 4. As soon as the controller is given a short initial movement to start the motor, the roller on the pawl 31 passes off the track 38 and the spring 35 forces the pawl down into engagement with the ratchet wheel 16. Further movement of the controller must now depend upon the movement of the ratchet wheel which in turn depends upon the rotation of the motor, since it is driven from the motor shaft. The controller may now be moved forward slowly by the operator, who keeps the controller pressed forward as much as possible. As the resistance is gradually cut out, the motor, and hence the ratchet wheel, will speed up, so that the controller can be moved forward more rapidly until the running position is reached. The dotted lines in Fig. 3 show the pawl mechanism just as it approaches the running position. When the full running position is reached the roller on the pawl 31 engages with its corresponding short section rail 43 and lifts the pawl out of engagement with the ratchet wheel. In the meantime the arm 28 has been moving in a clockwise direction (Fig. 4) carrying with it the pawls 32 and 33. The initial movement causes the roller on pawl 33 to leave the rail 40 so that the pawl 33 is forced into engagement with the ratchet wheel 18. In direction of movement, however, the pawl slips over the ratchet teeth, as shown in dotted lines in Fig. 4. When the running position is reached the roller on pawl 33 engages the rail section 45 and lifts the pawl at the same time that the pawl 31 is lifted. It will be understood, of course, that while the pawls 31 and 33 on the arms 29 and 28 respectively are engaging their ratchet wheels the other pawls 30 and 32 are held out of engagement with their ratchet wheels by the rails 39 and 41 respectively. The controller being now in the running position and it is desired to stop or retard the motor, the controller handle will be moved backward. This will cause the ratchet mechanism to return from the position shown in dotted lines (Figs. 3 and 4) toward the position shown in full lines. The ratchet wheels being still rotating in the same direction, the action of the pawls will be reversed. Pawl 33 will retard the controller while pawl 31 will slip over its ratchet wheel. The controller can be moved rapidly at first since the motor is rotating rapidly, but as the motor speed is reduced the rate of movement of the controller must also be reduced until when the off position is nearly reached the controller will be moved very slowly. I have shown the ratchet wheels 15 and 16 as being driven more slowly than the wheels 17 and 18, because generally the retarding operation should be relatively slower at least for the initial movement since the motor may then be running at full speed. If it is desired to reverse the motor, the controller will be turned in the reverse direction from the off position. The pawls 30 and 32 which have heretofore been inactive now come into use and the operation in this direction will be identical with that above described. The pawl mechanism will now be rotated to the right from the position shown in full lines in Fig. 3 and to the left from the position shown in full lines in Fig. 4. If power should fail or for any reason the motor should stop while the controller is in any other than the off position, the clutch 11 may be operated to release the controller mechanism from the motor and permit it to be turned back independently of the motor.

It will be understood, of course, that while I have shown my invention in connection with a particular system of control, namely a Ward Leonard system, my invention is in no sense limited to this particular control system but is equally applicable to other systems and in fact is in no sense dependent upon any particular system of control. Furthermore, while I have in accordance with the patent statutes shown and described a specific mechanism for carrying out my purpose, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. In combination, an electric motor, a manually operated controller therefor, and stop mechanism driven by the motor and interposed in the path of said controller for causing the rate of movement of the controller to depend upon the rate of rotation of the motor.

2. In combination, an electric motor, a manually operated controller therefor, and means whereby the movement of the controller in either direction is limited to a rate which is proportional to the rate of rotation of the motor.

3. In combination, an electric motor, a controller therefor, a stop mechanism for preventing the movement of the controller, and means whereby said mechanism is moved by the motor in advance of the controller so as to permit the latter to follow the movement of the motor.

4. In combination, an electric motor, a controller therefor, and a pawl and ratchet mechanism one member of which is moved by the controller while the other member is moved by the motor in advance of its coöperating member so as to permit the controller to follow the movement of the motor.

5. In combination, an electric motor, a controller therefor movable in two directions to accelerate and retard the motor respectively, and a pair of pawl and ratchet mechanisms one for each direction of movement of the controller, one member of each of said mechanisms being moved by the controller while the other member is moved by the motor in advance of its coöperating member so as to permit the controller to follow the movement of the motor.

6. In combination, an electric motor, a controller therefor movable in two directions to accelerate and retard the motor respectively, a pair of stop mechanisms one for preventing movement of the controller in each direction, and means whereby one of said mechanisms is moved by the motor in advance of the controller as the controller moves in each direction so as to permit the latter to follow the movement of the motor in either direction.

7. In combination, an electric motor, a reversible controller therefor, stop mechanism for preventing movement of the controller for either forward or reverse rotation of the motor, and means whereby said mechanism is moved by the motor in advance of the controller in either direction of movement so as to permit the latter to follow the movement of the motor as it rotates in either direction.

8. In combination, an electric motor, a controller therefor, a ratchet mechanism between the motor and the controller arranged to prevent movement of the controller in either direction from any operative position when the motor is stationary while permitting the controller to follow the movement of the motor in either direction.

9. In combination, an electric motor, a reversible controller therefor movable in two directions to accelerate and retard the motor respectively, and means for limiting the movement of the controller to a rate which is proportional to the rate of rotation of the motor, said means comprising two pairs of ratchet wheels driven by the motor the wheels of each pair being oppositely disposed, and two pairs of pawls moved simultaneously in opposite directions by the controller coöperating with said ratchet wheels.

In witness whereof, I have hereunto set my hand this 29th day of December, 1911.

FRED L. STONE.

Witnesses:
BENJAMIN B. HULL,
HELEN ORFORD.

Copies of this patent may be obtained for five cents each, by addressing the "Commissioner of Patents, Washington, D. C.".